Oct. 26, 1954   J. P. GOWLAND   2,692,530
PICTURE VIEWING DEVICE
Filed March 17, 1950
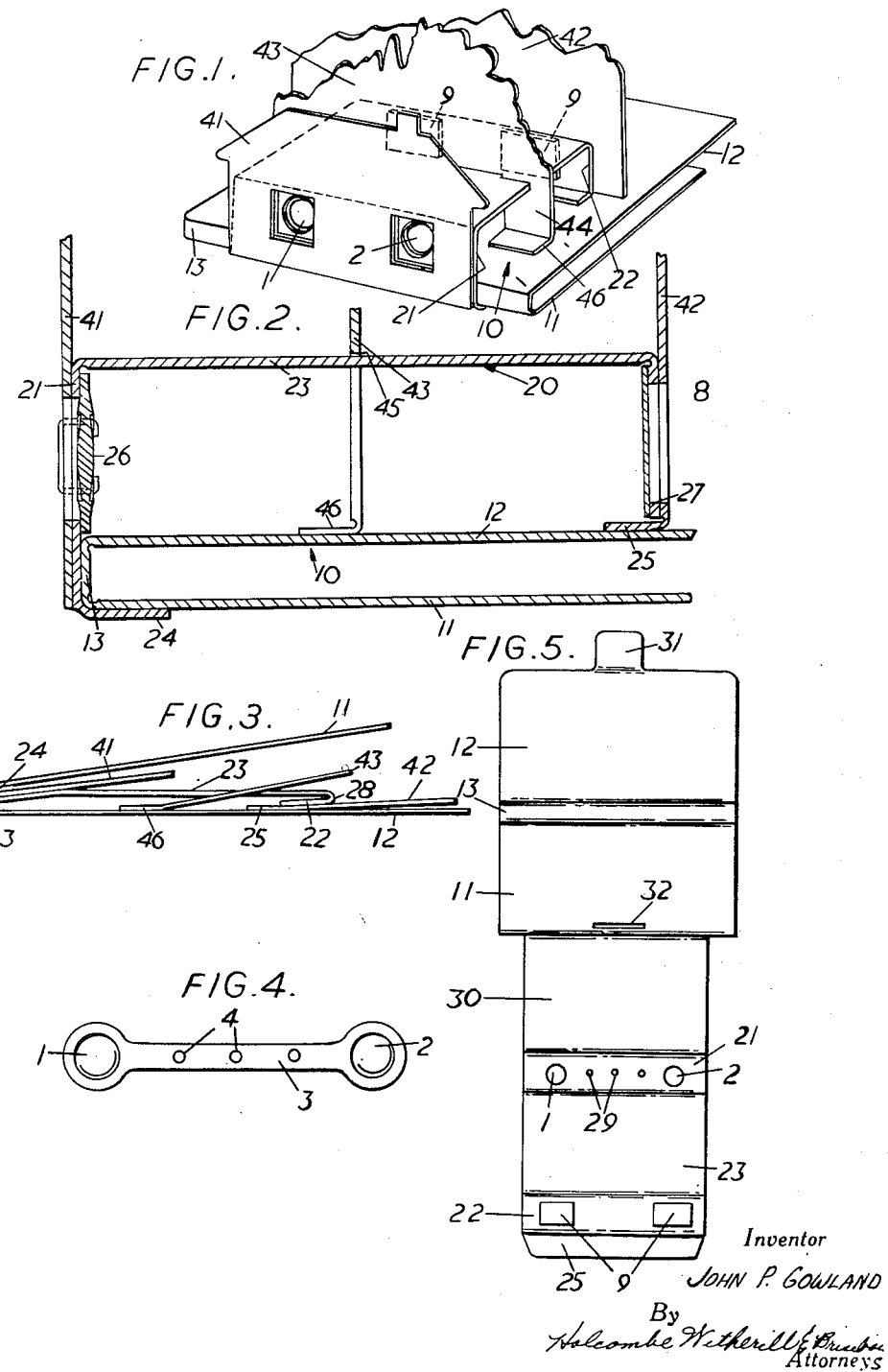
Inventor
JOHN P. GOWLAND
By Holcombe Witherill & Brisbin
Attorneys Patented Oct. 26, 1954

2,692,530

UNITED STATES PATENT OFFICE 2,692,530

PICTURE VIEWING DEVICE

John Pinkney Gowland, Santa Barbara, Calif.

Application March 17, 1950, Serial No. 150,333

Claims priority, application Great Britain
March 18, 1949

9 Claims. (Cl. 88—29)

This invention relates to picture viewing devices. Devices embodying the invention may be constructed for viewing either transparencies, or opaque pictures by reflected light, either singly or stereoscopically.

An object of this invention is to provide picture viewing devices of a collapsible nature suitable for transmission through the post as postcards or letters.

A further object is to provide collapsible picture viewing devices which can be moved from a substantially flat collapsed position into an operative position of adequate stability and vice versa by tilting one of a pair of cover sheets by approximately 360 degrees in relation to the other of said cover sheets.

In one aspect the invention consists in a picture viewing device comprising a back strip having two parallel longitudinal edges determining its width, two cover sheets each having a face and a back and one edge hingedly joined to one said longitudinal edge of the strip for permitting said cover sheets to be folded face to face at one side and back to back at the other side of said strip selectively, a front wall plate having two parallel edges spaced by several times the width of said back strip and at least one viewing aperture and being attached with one of said parallel edges to the front surface of one said cover sheet, adjacent its junction with said back strip, for hinge movement from a folded position in which said front wall plate is folded back upon the front of said one cover sheet, to a viewing position in which it is folded around the edge of said one cover sheet to extend at substantially right angles to the back of said sheet, a top wall plate having two parallel edges and being hingedly connected with one of its said edges to the other of said parallel edges of the front wall plate, a rear wall plate having two parallel edges and being hingedly connected with one of its said edges to the other said edge of the top wall plate, means for connecting the other of said parallel edges of the rear wall plate to the other said cover sheet for hinge movement about a line parallel to the said edge of said other cover sheet and spaced from said edge by the distance of said parallel edges of the top wall plate, the dimensions being such that when the two cover sheets are folded back to back with said back wall plate attached to said other cover sheet, the front wall plate is supported by the back strip to extend at substantially right angles beyond the front surface of said other cover sheet, and the back wall plate is held in a position substantially parallel to the front wall plate by its hinge connections with said other cover sheet and top wall plate, the device further comprising means for holding a viewing picture substantially in a plane with the back wall plate, and means for admitting light to said picture, whereby when the front wall is in its erect position, said picture can be viewed through the aperture in the front wall plate.

Other objects and features of the invention will become apparent from the following description and claims.

The term cardboard-type sheet material in this specification comprises cardboard, card, and stiff paper.

The lens or lenses may be made of moulded or pressed glass, or preferably of a transparent plastic, such as Perspex, and may be secured to the lens-carrier portion of the device in any suitable manner, such as by cementing the lens with a suitable cement, glue or adhesive to the cardboard or like material of the lens-carrier, or by retaining the lens in a pocket formed by cementing a ring or apertured piece of paper, cardboard or the like to the lens carrier over the lens. Alternatively, the lens may be formed with radial lugs which may be stitched or stapled to the lens carrier. In the case of a viewing device constructed as a stereoscope, a pair of lenses for binocular viewing may be formed as a single moulding or pressing in which the two lenses are integrally connected by a stem which fixes the spacing between the lenses. Such a unit has advantages in the manufacture of the viewing device, in that it facilitates handling of the lenses and their assembly in the device, as well as ensuring their accurate spacing. The unit may be attached by its stem to the lens carrier portion of the device, for instance by stitching or stapling the stem to the lens carrier, or by sticking a paper, cardboard or the like pocket or one or more straps to the lens carrier over the stem. The latter may be formed with protuberances serving to locate the lens unit in position on the lens carrier by registry in locating holes provided in the latter.

For the picture or pictures, transparencies on film or pictures on paper or card, in black and white or in colour, may be provided, which may be stuck on to the viewing wall portion of the device. Alternatively, several different pictures may be provided on a single film or paper strip which may be carried in a frame of cardboard or the like slidable along the viewing wall which acts as a support for the frame. If desired, guides may be provided in which the frame slides. For viewing transparencies, the viewing wall is provided with one or more windows to admit light for transmission through the transparency or transparencies, and the window or windows may be covered with a film or other form of thin translucent material to act as a diffusing screen.

A number of embodiments will now be described in detail with reference to the accompanying drawings, in which Fig. 1 is a perspective view showing one embodiment.

Fig. 2 is a detail thereof in section, drawn on a larger scale.

Fig. 3 is a side elevation of the same embodiment when folded.

Fig. 4 is a plan view showing an integral pair of lenses of synthetic resin as incorporaeted in the said embodiment.

Fig. 5 is a plan view showing a modified embodiment when in a flat, unfolded position.

Referring now first to Figs. 1 to 4, the viewing device is constructed after the style of a letter-card (folding postcard) and comprises a base sheet 10 of cardboard or the like divided in the middle by a narrow double crease or fold to form two similar flaps or cover sheets 11 and 12 hinged to a narrow backstrip or spine 13 having two parallel longitudinal edges determining its width. A second, smaller sheet 20 of cardboard or the like is divided by two parallel spaced creases or folds into three hinged portions, viz., two outer portions 21 and 22 hinged to a middle portion 23 which may be referred to as top wall plate. Each outer portion is subdivided by another parallel crease or fold to form a hinged end flap 24 and 25 respectively. The part of one outer portion 21 between its end flap and the middle portion of the sheet constitutes the front wall plate and is provided with two viewing apertures, preferably fitted with lenses 26, part 21 then constituting the lens carrier. The corresponding part of the other outer portion 22 constitutes a rear wall plate serving as the viewing wall earlier mentioned; for transparencies, it is provided with windows 27.

With the flaps of the base sheet 10 opened flat, the second sheet 20 is glued thereto by its end flaps 24 and 25, with its lens carrier part 21, its middle portion 23 and its viewing wall part 22 folded about their hinges into three sides of a parallelogram, the end flap 24 being glued to one base flap 11 with the hinge of the end flap along the hinge of the base flap, the other end flap 25 being glued to the other base flap 12. Referring to that side of each cover sheet to which the end flaps of sheet 20 are glued as the face and to the opposite side as the back of the cover sheet, when the base flaps 11 and 12 are folded inwardly to close them face to face, with the parallelogram sheet structure between them, the latter is caused to hinge at its corners and collapse into a flat condition between the closed base flaps or cover sheets as shown in Fig. 3, whereas when the latter are opened and folded outwardly through 360° so as to lie back to back as illustrated in Figs. 1 and 2, the parallelogram structure is erected into a substantially rectangular condition, forming with the folded base 11, 12 a sort of box which is open at the two opposite sides the bottom member of which is constituted by cover sheet 12, and which has the viewing aperture or apertures in the front wall plate 21 through which the picture or pictures at the opposite end wall (rear wall) 22 may be viewed. These pictures may be film transparencies 28 stuck to the inner side of the rear end wall 22 in front of the windows 27.

The purpose of providing the base with a double hinge so that it has a narrow spine 13 when folded is so that, when the base flaps 11 and 12 are folded back to back, the spine provides a sufficient bearing surface substantially at right angles to the base to locate the erected adjacent wall 21 of the viewing box also substantially at right angles to the base, as can be clearly seen in Fig. 2. Although the provision of the spine is preferred for that reason, it may be dispensed with if desired, the base then having a single hinge between its two flaps. The viewing aperture or apertures are preferably provided in that wall of the box adjacent the hinge or hinges of the base, as illustrated.

Since, with the arrangement described, the viewing box is erected over one of the base flaps, the inside surface of the other base flap is free to serve as a space for correspondence or printed matter.

Suitable means are provided for securing the base flaps together when the device is closed, for transmission through the post. For this purpose, the base flaps may be fastened by, e. g., metal clips, seals or adhesive tape, or they may be formed with gummed and perforated margins which can be stuck together to seal the device for mailing, and can be torn off along the perforations by the addressee in order to enable the device to be opened, as is usual with letter cards. The outside surface of either base flap provides space for addressing.

The device as illustrated is intended for use as a stereoscope, and has a pair of lenses which are formed as a single moulding or pressing as illustrated in Fig. 4. The two lenses 1 and 2 are integrally connected by a strip 3 which fixes the spacing between the lenses. This strip is provided with holes or with one-sided protuberances 4 serving to locate the lenses in position on the lens carrier 21 by registry in corresponding locating holes provided in the latter.

This viewing device can be readily combined with a scenic arrangement. Thus, as illustrated in Figs. 1 and 2, a cut-out 41 representing a foreground scenery may be cemented to the outer side of the front wall portion 21, suitable apertures, which may for example represent windows of a house, being left in the cut-out 41 in front of the viewing lenses 26. A similar background cut-out 42 may be secured to the outer side of the back wall portion 22, this latter cut-out being apertured, so as not to interfere with the access of light to the windows 27 if transparent pictures are to be viewed. A supplementary plate in the form of a still further cut-out 43 may be arranged between the foreground and background cut-outs 41 and 42, this cut-out 43 being provided with one or more leg portions 44, which extend through slots 45 in the top plate 23 of the structure 10 and are hinged to the bottom plate 12 by end flaps 46. A single leg portion may be arranged near the middle of the cut-out 43 but preferably as illustrated two narrow leg portions 44 are respectively arranged at the two sides of the said cut-out, the arrangement being such in either case as to cause little or no obstruction to the viewing of the pictures.

While an integral pair of lenses may be used similarly as has been described, it may alternatively be equipped with separate lenses which may be secured to the cardboard or the like by cementing with suitable glue or adhesive or by cementing a ring or apertured piece of paper, cardboard or the like to the lens carrier over the lens.

Fig. 5 shows a device which operates similarly to the one shown in Fig. 1 but is formed as a single flat strip of material adapted to be folded into its final form. The base parts 11, 12, 13 are constituted in the same way as in the example of Fig. 1 with part 11 having a further edge parallel to that joining the back strip 13, but the hinged flap 24 is replaced by a strip portion 30 forming a supplementary sheet integral both with front wall portion 21 and base portion 11 and hinged to both of them, the length of the portion 30 being equal to the length of the flap 11 from its edge adjacent back strip 13 to said further edge at right angles to the hinges and preferably equal to the aggregate lengths of the parts 21 and 23. For despatch the strip 30 may be folded upon the base part 11, the front and top walls 21 and 23 being then folded back over the strip 30, while the back wall 22 and the end flap 25 are doubled back upon the top portion 23, the whole being then covered by folding the bottom part 12 over the bottom part 11 and securing the two together, for example by folding a tab 31 of the flap 12 round the outer edge of bottom part 11 and inserting it into a slot 32 in said part 11. The recipient opens the flaps 11, 12 and unfolds the strip constituted by parts 21, 22, 23 and 25, folds the strip 30 underneath the base part 11, and folds the parts 21, 23, 22 and 25 so as to obtain a parallelogram structure identical with that illustrated in Fig. 1, securing the flap 25 to the base 12. For this purpose the flap 25 is preferably coated with an adhesive. When not in use, the device may be folded similarly as in the example of Fig. 1. Since the strip 30 need not be separated again from its position under the base part 11, it may if desired be also coated with an adhesive so that it can be stuck to the base 11.

The invention is not limited to the illustrated embodiments which may be various modified within the scope of the appended claims.

I claim:

1. A picture viewing device comprising a cover sheet constituting a bottom member, a rear wall plate for supporting a picture, a top wall plate, and a front wall plate having at least one viewing aperture, said cover sheet and said plates all made of stiff sheet material and all hingedly joined together along parallel lines, said front wall plate having a bottom edge parallel to said lines of junction, and said bottom member having a front edge parallel to said lines of junction, so that said cover sheet and all said plates jointly form a continuous strip capable of being hingedly moved into substantially parallelogram shape with such viewing aperture facing the rear wall plate and with the front wall plate projecting beyond the bottom member at said front edge of the latter, a back strip hingedly connected to said front edge of the bottom member so as to be adapted to project downwardly thereof in surface contact with said projecting part of the front wall plate and coextensive therewith, another cover sheet hingedly connected to the free edge of the back strip, and an attachment strip hingedly connected with said bottom edge of the front wall plate and secured to said other cover sheet, with said hinge connection between the attachment strip and front wall plate approximately coincident with that between said other cover sheet and said back strip.

2. A device as claimed in claim 1, in which said front and rear wall plates are extended beyond their hinged connection to the top plate, the extension parts being shaped to represent foreground and background scenery respectively.

3. A device as claimed in claim 2, in which at least one slot parallel to said parallel lines of junction is provided in the top wall plate, and further comprising a complementary plate representing a further piece of scenery above said top plate, said supplementary plate having at least one extension, with projects or project through said slot or slots and is or are hinged to the bottom member so as to be held parallel to the front and rear wall plates.

4. A picture viewing device comprising a pair of stiff cover sheets, an elongated back strip having two parallel edges and being hingedly connected at said edges to said two cover sheets respectively, a stiff top wall plate having two parallel edges, a stiff rear wall plate having two parallel edges and being hingedly secured at one of said edges to one of said edges of the top wall plate, means at the other said edge of the rear wall plate for hingedly connecting said rear wall plate to one said cover sheet at a line parallel to the line of connection between the back strip and said top wall plate and at a distance from said last-mentioned line equal to the distance between said parallel edges of the top-wall plate, a front wall plate having two parallel edges spaced by a distance exceeding the distance of said edges of the rear wall plate by the width of said back strip, said front wall plate being hingedly connected at one of its said edges to the other said edge of the top wall plate, an auxiliary sheet member hingedly connected to the other said edge of the front wall plate, said auxiliary sheet member being fixed to the other said cover sheet in such manner as to permit the front wall plate to be folded round the hinged connection between said other cover sheet and back strip and when so folded restrain the adjacent edge of the front wall plate from movement parallel to said other cover sheet, said front wall plate having an aperture through which at least part of said back wall plate can be viewed, the device also including means for supporting at least one picture at said part of the back wall, and apertures through which light can fall on such picture.

5. A picture viewing device as claimed in claim 4, which is formed of cardboard-type material, the hinge connections being constituted by reducing the stiffness of the material along the hinge.

6. A picture viewing device as claimed in claim 4, wherein said cover sheets are so dimensioned as to cover, when folded face to face, the whole of said front, top, and back wall plates folded therebetween and are provided with means for retaining them in such folded condition.

7. A picture viewing device comprising a back strip having two parallel longitudinal edges, two cover sheets, each having a face and a back and an edge hingedly joined to one said longitudinal edge of the back strip to permit said cover sheets to be folded face to face at one side and back to back at the other side of said strip selectively, a front wall plate having two parallel edges spaced by several times the width of said back strip, two viewing apertures spaced in the direction of said edges and being attached with one of its parallel edges to the face of one said cover sheet, adjacent its junction with said back strip, for hinge movement from a folded position in which said front wall plate is folded back upon the front of said one cover sheet, to a viewing position in which it is folded round the edge of the said one cover sheet to extend at substantially right angles to the back of said sheet, a pair of viewing lenses secured to said front wall plate in substantial alignment with said apertures thereof, a top wall plate having two parallel edges and being hingedly connected with one of its said edges to the other of said parallel edges of the front wall plate, a rear wall plate having two parallel edges and being hingedly connected with one of its said edges to the other said edge of the top wall plate, the other of said parallel edges of the rear wall being connected to the other said cover sheet for hinge movement about a line parallel to the said edge of said other cover sheet and spaced from said edge by the distance of said parallel edges of the top wall plate, the dimensions being such that when the two cover sheets are folded back to back the front wall plate is supported by the back strip to extend at substantially right angles beyond the front surface of said other cover sheet, and the back wall plate is held in a position substantially parallel to the front wall by its hinge connections with said other cover sheet and top wall plate, the device further comprising means for holding a pair of stereoscopic viewing pictures substantially in a plane with the back wall plate, and means for admitting light to said pictures, whereby when the front wall is in its erect position, said pictures can be viewed stereoscopically through the apertures in the front wall plate, said cover sheets being so dimensioned as to cover, when folded front to front, the whole of said front, top, and back wall plates folded therebetween.

8. A picture viewing device comprising a back strip having two parallel edges determining its width, two cover sheets each having a face and a back and one edge hingedly joined to one said longitudinal edge of the strip for permitting said cover sheets to be folded face to face at one side and back to back at the other side of said strip selectively, one said cover sheet having a further edge parallel to its said edge, a supplementary sheet having a pair of parallel edges spaced by the same distance as said edge and further edge of said cover sheet and hingedly joined to said further edge of said cover sheet by one of its said parallel edges, a front wall plate having two parallel edges spaced by several times the width of said back strip and at least one viewing aperture and being attached with one of said parallel edges to the free edge of said supplementary sheet, so as to be capable when said supplementary sheet is doubled back on said one cover sheet, of hinge movement from a folded position in which said front wall plate is folded back upon the front of said one cover sheet, to a viewing position in which it is folded round the edge of said one cover sheet and back strip to extend at substantially right angles to the back of said cover sheet, a top wall plate having two parallel edges and being hingedly connected with one of its said edges to the other of said parallel edges of the front wall plate, a rear wall plate having two parallel edges and being hingedly connected with one of its said edges to the other said edge of the top wall plate, means for connecting the other of said parallel edges of the rear wall plate to the other said cover sheet for hinge movement about a line parallel to the said edge of said other cover sheet and spaced from said edge by the distance of said parallel edges of the top wall plate, the dimensions being such that when the two cover sheets are folded back to back with said back wall plate attached to said other cover sheet, the front wall plate is supported by the back strip to extend at substantially right angles beyond the front surface of said other cover sheet, and the back wall plate is held in a position substantially parallel to the front wall plate by its hinge connections with said other cover sheet and top wall plate, the device further comprising means for holding a viewing picture substantially in a plane with the back wall plate, and means for admitting light to said picture, whereby when the front wall is in its erect position, said picture can be viewed through the aperture in the front wall plate.

9. A picture viewing device as claimed in claim 8, in which all said sheets and wall plates and said back strip are formed from one integral piece of cardboard-type material rendered flexible along the lines of the hinge connections therebetween.

References Cited in the file of this patent

UNITED STATES PATENTS

| Number | Name | Date |
| --- | --- | --- |
| 1,655,989 | Duval | June 10, 1928 |
| 1,913,797 | Dulin et al. | June 13, 1933 |
| 2,071,120 | Harlow | Feb. 16, 1937 |
| 2,190,646 | Branson | Feb. 20, 1940 |

FOREIGN PATENTS

| Number | Country | Date |
| --- | --- | --- |
| 337,737 | France | Feb. 29, 1904 |